United States Patent Office 3,216,995
Patented Nov. 9, 1965

3,216,995
METHOD FOR THE PRODUCTION OF CATIONIC DYESTUFFS
Hans Baumann and Johannes Dehnert, Ludwigshafen (Rhine), Germany, assignors to Badische Anilin- & Soda-Fabrik Aktiengesellschaft, Ludwigshafen (Rhine), Germany
No Drawing. Original application June 22, 1959, Ser. No. 821,644, now Patent No. 3,102,879, dated Sept. 3, 1963. Divided and this application Oct. 1, 1962, Ser. No. 227,522
Claims priority, application Germany, Oct. 3, 1958, B 50,587
6 Claims. (Cl. 260—157)

This invention relates to a process for the production of new cationic dyestuffs and especially it relates to a process for the production of dyestuffs the cation of which contains an imidazole ring on the one hand and a benzene or naphthalene ring on the other hand. This application is a divisional application of our copending application, Serial No. 821,644, filed June 22, 1959, now U.S. Patent No. 3,102,879.

We have found that a group of valuable dyestuffs are those which contain cations of the general formula

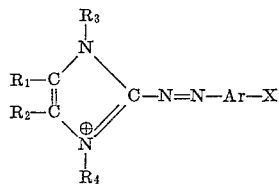

in which $R_1$ and $R_2$ each represents a hydrogen atom or an alkyl, cycloalkyl, aralkyl or aryl radical or both are members of a common non-aromatic isocyclic or heterocyclic ring, $R_3$ and $R_4$ each is an alkyl, cycloalkyl or aralkyl group, Ar represents an ortho-phenylene, para-phenylene, ortho-naphthylene or para-naphthylene group and X is a radical of the general formula

in which $R_5$ represents a hydrogen atom, a free or substituted alkyl, cycloalkyl or aralkyl group, $R_6$ is a free or substituted alkyl, cycloalkyl, aralkyl or aryl group or $R_5$ and $R_6$ both are members of a common heterocyclic ring.

These dyestuffs, of which the anions may be any inorganic or organic colorless anions and of which the rings may contain substantially neutral substituents or atoms, conventional in dyestuff chemistry, as for example halogen, alkyl, aralkyl, hydroxyl, alkoxyl, nitro, cyano, primary, secondary or tertiary amino, acylamino, alkylsulfone, arylsulfone, carboxylic acid, carboxylic acid ester and/or possible substituted carboxylic acid amide, sulfonic acid amide or arylazo groups, may be obtained by the following method of preparation:

Aromatic amino compounds of the general formula $$H_2N—Ar—H$$

in which Ar has the above meaning are diazotized and coupled with the imidazoles of the formula

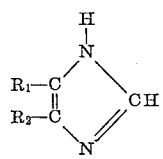

in which $R_1$ and $R_2$ have the meanings given above.

The alkylation of the monoazo disazo dyestuffs thus prepared is carried out with alkylating, aralkylating or cycloalkylating agents, such as methyl chloride, ethyl bromide, benzyl chloride, phenacyl chloride, and dialkyl sulfates or alkyl esters of aromatic sulfonic acids, such as dimethyl sulfate, toluene sulfonic acid methyl ester or toluene sulfonic acid (2-chlor)-ethyl ester. The alkylation can be carried out in aqueous solution or suspension or in organic solvents at normal or raised temperature. It is advantageous to work in the presence of acid-binding agents, such as alkali hydroxides, or alkaline earth exodes or carbonates. Simultaneously with the alkylation of the imidazole ring, groups containing substitutable hydrogen present in the initial material, such as hydroxyl, carboxylic acid or amino groups, may also be chemically changed, for example etherified, esterified, or alkylated. Finally, nitro groups contained in the quaternary salts formed can also be reduced or acylamino or ester groups can be hydrolyzed.

The quaternary dyestuff salts obtained are then reacted with primary or secondary aliphatic, araliphatic or heterocyclic, preferably non-aromatic, amines in the presence of oxydizing agents. Amines suitable for this purpose are, for example: monomethylamine, dimethylamine, diethylamine, methyl-2-hydroxyethylamine, ethyl-2-cyanoethylamine, methyl-2-cyanomethylamine, 1-amino-3-methoxypropane, 1-methylamino-3-methoxypropane, N,N-dimethyl-1,3-diaminopropane, pyrrolidine, piperidine, hexamethylene imine, morpholine, piperazine, benzylamine or benzylmethylamine. The reaction of the quaternary dyestuff salts with the amines is carried out in aqueous or organic solution, for example, in methanol, ethanol, acetone, formamide, dimethylformamide or simply in an excess of the amine as solvent, in general at ambient but also at elevated temperature. Suitable oxidizing agents are, for example, atmospheric oxygen, hydrogen peroxide, hypochlorites, persulfates, iron (III), copper (II), mercury (II), lead (IV) or cerium (IV) salts and hexacyano ferrates (III); if necessary, oxygen transferring catalysts, as for example heavy metals and their salts, may be coemployed. After the end of the reaction, which can readily be followed papyrographically, i.e., by paper chromatographic methods, the product is acidified and any undesirable byproducts, as for example, lead (II) salts, removed by precipitation in the form of carbonates, sulfates or sulfides. The dyestuff is then isolated from the filtrate in the usual way by salting out or by the production of less soluble salts. When the oxidation is effected with hexacyano ferrate (III), the dyestuff is obtained, by acidification as the less water-soluble hexacyano ferrate (II). It is especially advantageous to react the quaternary dyestuff salts prepared in water or organic solvents with the said amines without having been isolated.

The process described has the advantage, as compared with the conventional method of preparing these dyes by which N-substituted 1,2- or 1,4-diamino-benzene and -naphthalene derivatives are used which are sensitive to atmospheric oxygen and give diazo compounds which sometimes have little reactivity, that there are used according to the present invention aminobenzenes unsubstituted in ortho- or para-position and primary and secondary amines all of which are accessible in large numbers and easy to handle. The smooth reaction of this invention is surprising because it is known that hydrogen atoms on non-activated aryl radicals are in general very firmly combined.

The dyestuffs obtained by the method described herein have the character of cationic or basic dyestuffs. Their anions may be any inorganic or organic anions, e.g., halogen, perchlorate, sulfate, methosulfate or alkyl-benzene sulfonic acid ester anions; furthermore they can form double salts, e.g., with heavy metal salts as zinc chloride etc. They are more or less soluble in water depending on the nature of the anion associated therewith, and can be converted by reaction with suitable acids or acid dyestuffs into lacquer or pigment dyestuffs. When they have sufficient solubility in water they may be used for dyeing structures such as fibers, flock, threads, foils or woven or knitted goods, for example from mordanted cotton, natural or synthetic polyamides, such as wool, silk, leather, polyhexamethylene diamine adipate or polycaprolactam or from other synthetic materials, such as cellulose esters or ethers, polyurethanes or polyesters; especially on materials of polyacrylonitrile or copolymers containing acrylonitrile, they yield dyeings or prints in very fast pure shades of good color strength by mass, spin or bath dyeing or printing.

The following examples will further illustrate this invention but the invention is not restricted to these examples. The parts specified are parts by weight.

*Example 1*

A solution of 10 parts of imidazole in 150 parts of water is gradually added to the diazonium solution obtained in the usual way from 9.3 parts of aminobenzene, and then 60 parts of 10% caustic soda solution are added while cooling externally. After the end of the coupling, neutralization is effected with 15 parts of 30% acetic acid and the deposited yellow azo compound is filtered off by suction. It is stirred, without drying, with 250 parts of water. Then 10 parts of magnesium oxide, 250 parts of ice and, while simultaneously cooling externally, 32 parts of dimethyl sulfate are gradually added. When the methylation has ended, any excess of magnesium oxide present is filtered off, 30 parts of lead (IV) oxide and 50 parts of piperidiine are added to the filtrate and the reaction mixture is stirred at room temperature until the initial dyestuff can no longer be detected. It is then acidified with 50 parts of 30% acetic acid; finally 200 parts of saturated sodium sulfate solution are added, the precipitate formed is separated from lead compounds, the dyestuff is precipitated from the filtrate by the addition of 20 parts of 50% zinc chloride solution and 1000 parts of saturated sodium chloride solution and dried. It is obtained as a violet powder with a bronze luster which dissolves in water with a bluish-red color and dyes polyacrylonitrile material in bluish-red shades of good fastness properties.

Cationic dyestuffs may also be prepared in an analogous way using the following components:

| Example No. | Diazo component | Coupling component | Amino component | Shade of color of dyeings |
|---|---|---|---|---|
| 2 | Aminobenzene | Imidazole | Pyrrolidine | Blue-red. |
| 3 | ----do---- | ----do---- | Dimethylamine. | Do. |
| 4 | 1-amino-2-nitrobenzene. | ----do---- | Piperidine | Do. |
| 5 | ----do---- | ----do---- | Morpholine | Red. |
| 6 | 1-amino-3-methoxybenzene. | ----do---- | Pyrrolidine | Violet. |
| 7 | 1-amino-2,5-dimethoxybenzene. | ----do---- | ----do---- | Red-violet. |

*Example 8*

The monoazo dyestuff aminobenzene → imidazole is methylated as in Example 1 with dimethyl sulfate in the presence of magnesium oxide, and after precipitation with zinc chloride and solium chloride, the product is isolated and dried.

A solution of 16 parts of the dyestuff thus obtained the cation of which has the formula

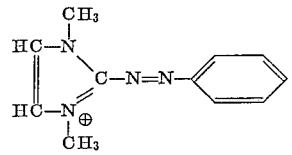

in 30 parts of water is added to 100 parts of pyrrolidine and 50 parts of a 10% aqueous hydrogen peroxide solution. The mixture is stirred at room temperature until the reaction has ended and then allowed to flow with external cooling into a mixture of 100 parts of glacial acetic acid and 3000 parts of saturated sodium chloride solution. By adding 50 parts of 50% zinc chloride solution, the dyestuff is precipitated as the zinc chloride double salt, filtered off by suction and dried. It is obtained in the form of a dark powder with a bronze luster which dissolves in water with a bluish-red color and dyes acrylonitrile fibers from a sulfuric acid bath in bluish-red shades of good fastness properties.

Corresponding dyestuffs can be prepared by using the following components:

| Example No. | Diazo component | Coupling component | Amines | Shade of color of the dyeings |
|---|---|---|---|---|
| 9 | Aminobenzene. | Imidazole | Piperidine | Bluish-red. |
| 10 | ----do---- | ----do---- | Pyrrolidine | Do. |
| 11 | ----do---- | ----do---- | Benzylamine | Red. |

*Example 12*

The monoazo dyestuff 1-amino-2-nitrobenzene → imidazole is dissolved in chlorobenzene and methylated at 100° C. with 2 mols of diethyl sulfate in the presence of 1 mol of magnesium oxide. The dyestuff salt, after being isolated and freed from solvent, is dissolved in water, precipitated with zinc chloride, isolated and dried.

To a solution of 14 parts of the dyestuff thus obtained, the cation of which has the formula

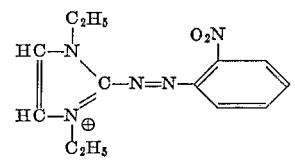

in 400 parts of water, there are added in one batch 17 parts of piperidine and then 110 parts of a 1-molar solution of potassium hexacyanoferrate (III) are allowed to flow in gradually. The separation of the dyestuff present as hexacyanoferrate (II) is completed by addition of 50 parts of 30% acetic acid. After filtration by suction, washing with a little water and drying, the dyestuff is obtained as a dark red powder which dissolves in hot water with a bluish-red color and gives fast bluish-red dyeings on polyacrylonitrile fibers from an acetic acid bath.

The following dyestuffs can be prepared in a corresponding way:

| Example No. | Diazo component | Coupling component | Amines | Shade of color of the dyeings |
|---|---|---|---|---|
| 13 | 1-amino-3-methylbenzene. | Imidazole | Piperidine | Bluish-red. |
| 14 | Aminobenzene. | ----do---- | ----do---- | Do. |
| 15 | ----do---- | ----do---- | Diethylamine | Do. |

We claim:
1. A process for the production of a cationic dyetuff which comprises reacting a compound of the formula

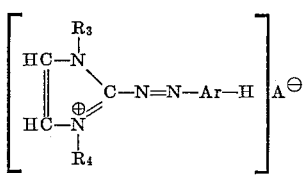

in which each of $R_3$ and $R_4$ represents lower alkyl, Ar represents a divalent radical selected from the class consisting of p-phenylene, methyl-p-phenylene, nitro-p-phenylene, methoxy-p-phenylene and dimethoxy-p-phenylene and A represents an anion, with a compound selected from the class consisting of monomethylamine, dimethylamine, diethylamine, methyl-2-hydroxyethylamine, ethyl-2-cyanoethylamine, methyl-2-cyanomethylamine, 1-amino-3-methoxypropane, 1-methylamino-3-methoxypropane, N,N-dimethyl-1,3-diaminopropane, pyrrolidine, piperidine, hexamethylene imine, morpholine, piperazine, benzylamine and benzylmethylamine in the presence of an inorganic oxidizing agent.

2. A process as claimed in claim 1 wherein the oxidizing agent is a member selected from the group consisting of hydrogen peroxide, lead (IV) salts and hexacyanoferrates (III).

3. The process for the production of a cationic dyestuff which comprises reacting the compound of the formula:

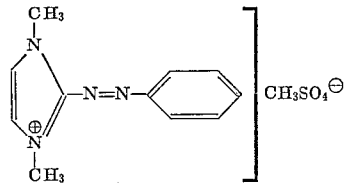

with piperidine in the presence of lead (IV) oxide.

4. The process for the production of a cationic dyestuff which comprises reacting the compound of the formula:

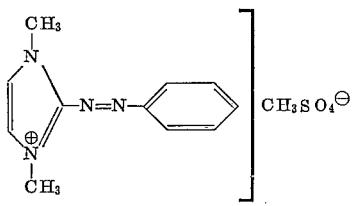

with dimethylamine in the presence of lead (IV) oxide.

5. The process for the production of a cationic dyestuff which comprises reacting the compound of the formula:

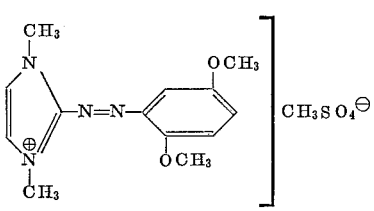

with pyrrolidine in the presence of lead (IV) oxide.

6. The process for the production of a cationic dyestuff which comprises reacting the compound of the formula:

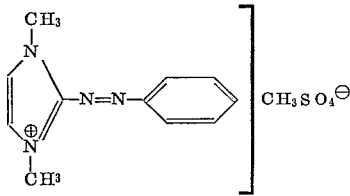

with pyrrolidine in the presence of hydrogen peroxide.

No references cited.

CHARLES B. PARKER, *Primary Examiner.*